UNITED STATES PATENT OFFICE.

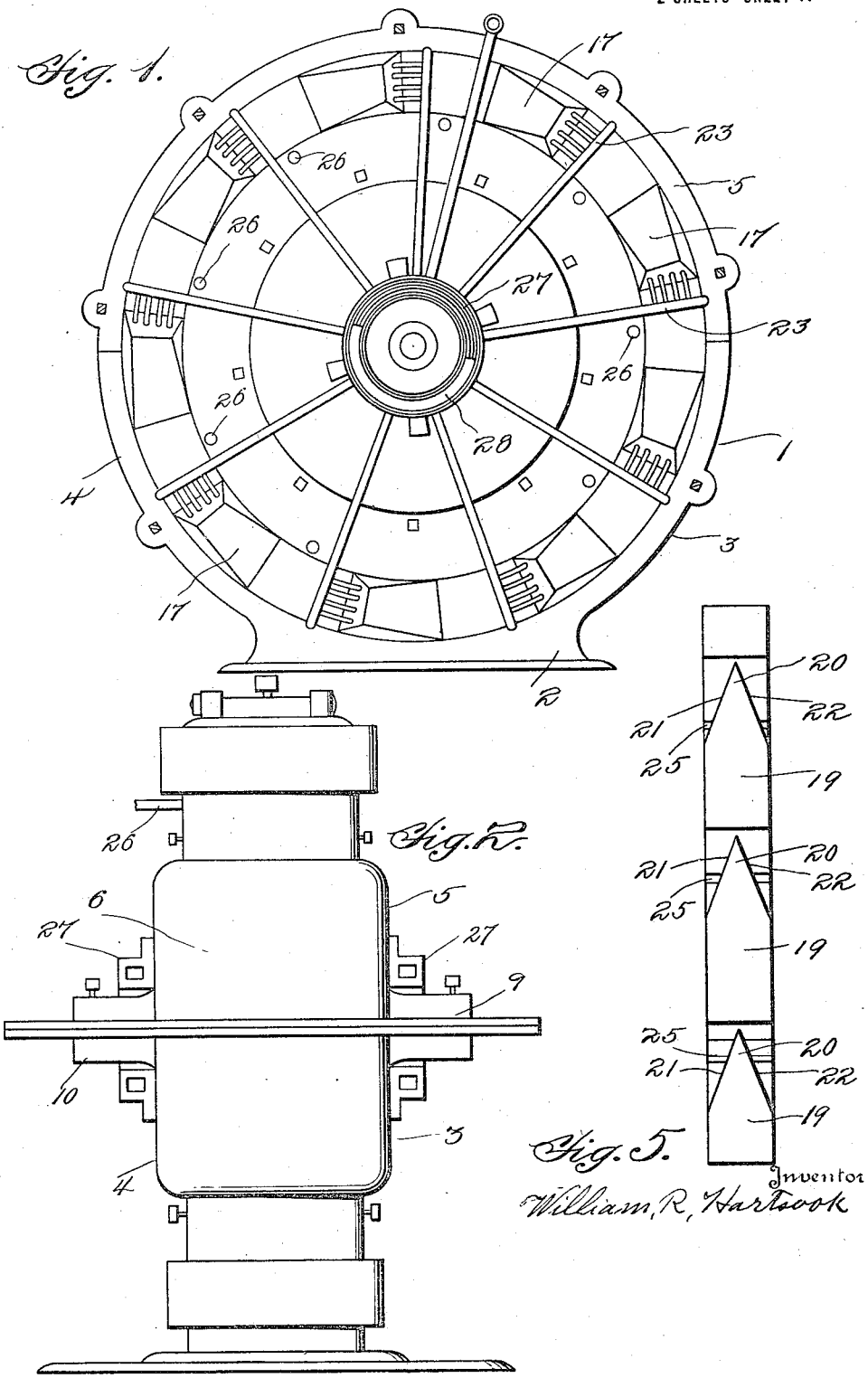

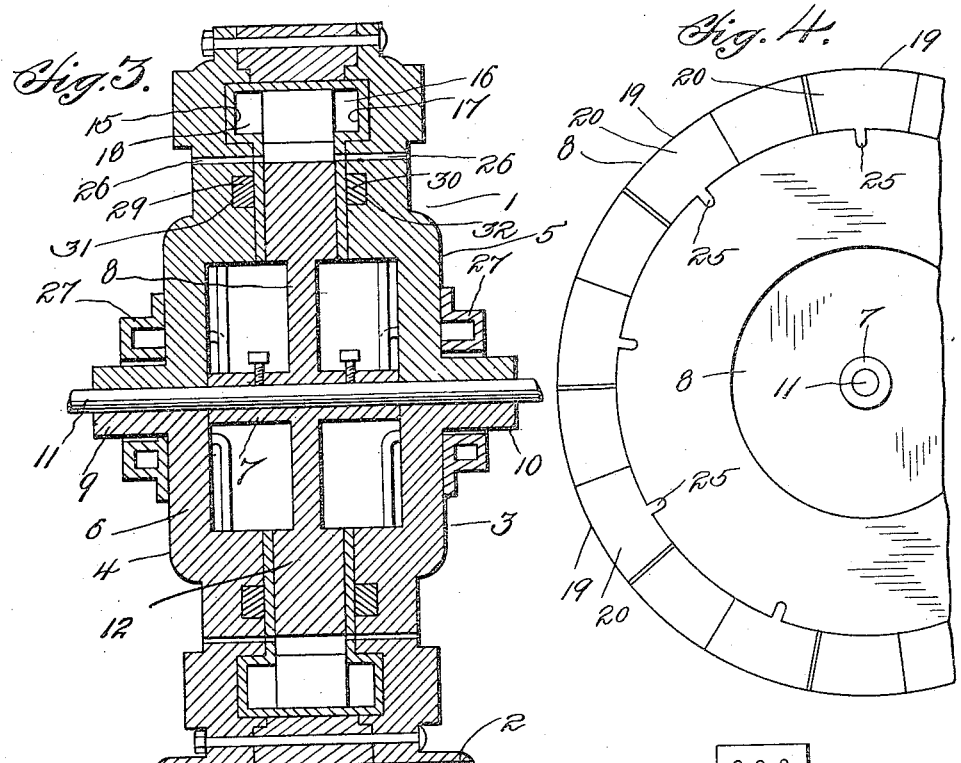
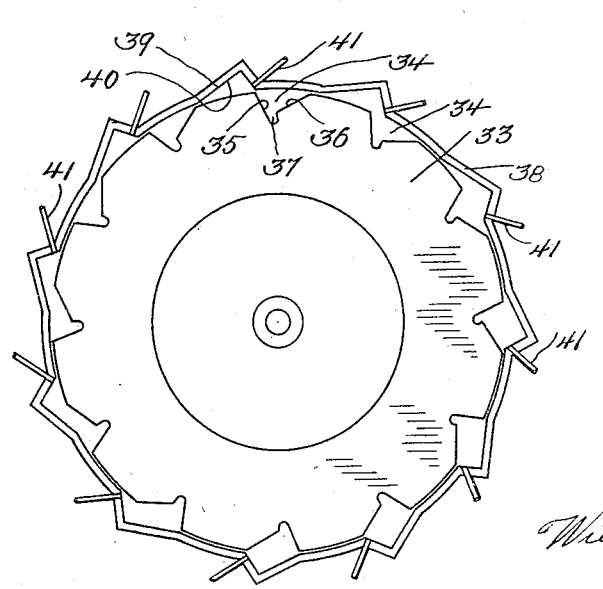
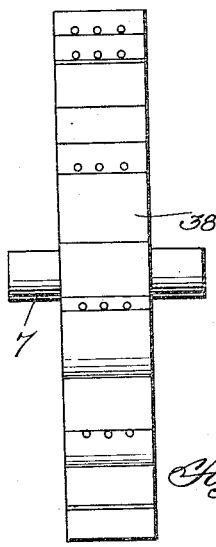

WILLIAM R. HARTSOOK, OF PORTLAND, OREGON.

TURBINE.

1,259,094. Specification of Letters Patent. Patented Mar. 12, 1918.

Application filed May 12, 1917. Serial No. 168,141.

*To all whom it may concern:*

Be it known that I, WILLIAM R. HARTSOOK, a citizen of the United States, residing at Portland, in the county of Multnomah and State of Oregon, have invented certain new and useful Improvements in Turbines, of which the following is a specification.

This invention relates to improvements in turbines, and has for its object to provide such an engine with a plurality of steam pockets and a plurality of exhaust ports.

Another object of the invention is to provide a rotary engine with a rotor having pockets entirely around the periphery thereof and a casing having exhaust ports extending entirely therearound.

A still further object of the invention is to provide the combination of a rotary engine having a rotor provided with pockets arranged at close intervals entirely around its periphery and a casing having inlet ports arranged at intervals entirely therearound and exhaust ports entirely therearound.

A still further object of the invention is to provide a rotary engine having a plurality of pockets arranged at close intervals entirely around its periphery and a casing having a plurality of exhaust ports arranged at intervals therearound, said exhaust ports being one less in number than said pockets.

With the above and other objects in view, I have invented the device illustrated in the accompanying drawings, in which, Figure 1 is a side elevational view of my invention;

Fig. 2 is an end elevational view thereof;

Fig. 3 is a central sectional view through the turbine;

Fig. 4 is a side elevational view of a rotor;

Fig. 5 is an edge view thereof, and,

Fig. 6 is a side elevational view of a modified form of the invention with one of the casings removed.

Fig. 7 is an elevational view of Fig. 6.

Like reference characters indicate like parts throughout the following specification and in the drawings in which 1 indicates my improved rotary engine which consists of a base 2 and a casing 3 formed in sections 4 and 5, said casing having an enlarged central portion 6 for the elongated hub 7 of the rotor 8, said casing having hubs 9 and 10 alining with the hub 7 of said rotor and 11 is a shaft fixedly secured in the rotor hub 7 and rotatable therewith. The peripheral portion 12 of the rotor is reduced in width to operate between the adjacent walls of the casing. Arranged at close intervals entirely around the peripheral portion of said casing are pockets 15 and 16, which aline with one another and have inclined walls 17 and 18 and the peripheral surface of the rotor is provided with a plurality of pockets 19 having V-shaped extensions 20, the walls of said extensions adapted to aline with the inclined walls 17 and 18 of said pockets 15 and 16, whereby said walls 17 and 18 and the walls 21 and 22 of said extensions 20 periodically form continuations of one another during the revolution of the rotor. At the period when the walls 17, 18, 21 and 22 aline, steam or other driving fluid is admitted through the inlet ports 23 and 24 provided for each of the pockets 15 and 16 throughout the entire circumference of the casing. Each of the pockets 19 is provided with exhaust ports 25 which periodically aline with exhaust ports 26 in the casing. The number of exhaust ports 26 in the casing are only one less than the number of pockets 19 in the rotor. These ports 26 are arranged at suitable intervals around the casing and permit exhaustion of the driving fluid from the pockets 19 shortly after said fluid has been admitted to said pockets 19. The fact that there is one more pocket in the rotor than exhaust ports 26 in the casing prevents a dead center of the rotor. The inlet ports 23 all connect with the circular supply pipe 27 formed around the hub 11, said ports 23 having radial connection with said pipe 27. An inlet 28 is provided in the pipe 27 for the admission of steam from a supply source. Gaskets 29 and 30 are seated in the channels 31 and 32 formed around the inner wall of the casing members 4 and 5.

The provision of a rotor with a large number of pockets around its periphery and an equal number of steam inlet ports arranged around the casing in combination with means for permitting the exhaust of used steam quickly from the pockets assures a very powerful engine as the steam is exhausted as soon as its power has been exerted upon the rotor and fresh supply of steam almost immediately exerted against the rotor. This action takes place almost simultaneously a large number of times, the exact number depending of course upon the size of the rotor and the number of pockets provided therein.

In Fig. 6 I show a slight modification of the invention in which the rotor 33 is provided with pockets 34 having inclined walls 35 and 36 terminating in an exhaust port 37 which alines at intervals with outlet ports in the casing 38.

The peripheral wall 39 of the casing 38 is provided with a plurality of pockets 40, similar in shape to the pockets 34 but in reverse relation thereto. Each of the pockets 40 are provided with steam inlet ports 41 for the admission of steam. There is in this form of the invention one more pocket in the rotor than is provided in the casing. By means of this arrangement the rotor pockets and casing pockets do not all aline at the same time. This overcomes any intermittent action as certain of the pockets are receiving a fresh supply of steam, while certain of the other pockets are exhausting and still others being in a neutral condition.

Having thus described the invention, that which is claimed as new and desired to be secured by Letters Patent is:

An engine of the character described including a casing and a rotor, each having a plurality of pockets and an inlet port for each of said casing pockets, said casing having a hub, a supply pipe extending therearound, and communicating with all of said inlet ports.

In testimony whereof I affix my signature in the presence of two witnesses.

WILLIAM R. HARTSOOK.

Witnesses:
F. O. NORTHRUP,
FRED L. MOORE.

Copies of this patent may be obtained for five cents each, by addressing the "Commissioner of Patents, Washington, D. C."